US012202157B2

(12) United States Patent
Han et al.

(10) Patent No.: US 12,202,157 B2
(45) Date of Patent: Jan. 21, 2025

(54) RAZOR CARTRIDGE

(71) Applicant: DORCO CO., LTD., Seoul (KR)

(72) Inventors: Da Woon Han, Seoul (KR); Shin Hwan Park, Seoul (KR)

(73) Assignee: Dorco Co., Ltd., Seoul (KR)

(*) Notice: Subject to any disclaimer, the term of this patent is extended or adjusted under 35 U.S.C. 154(b) by 0 days.

(21) Appl. No.: 17/444,940

(22) Filed: Aug. 12, 2021

(65) Prior Publication Data

US 2022/0063120 A1 Mar. 3, 2022

(30) Foreign Application Priority Data

Aug. 27, 2020 (KR) ........................ 10-2020-0108460

(51) Int. Cl.
*B26B 21/22* (2006.01)
*B26B 21/44* (2006.01)

(52) U.S. Cl.
CPC ............ *B26B 21/443* (2013.01); *B26B 21/22* (2013.01)

(58) Field of Classification Search
CPC .............................. B26B 21/443; B26B 21/22
USPC .................................................. 267/182, 160
See application file for complete search history.

(56) References Cited

U.S. PATENT DOCUMENTS 5,409,200 A * 4/1995 Zingher .................. F16F 1/185 267/80
6,161,288 A 12/2000 Andrews
6,983,924 B2 * 1/2006 Howell ................... F16F 3/026 251/118
2004/0231161 A1 * 11/2004 Coffin ................. B26B 21/4006 30/50
2011/0146079 A1 6/2011 Clarke et al.
2012/0317818 A1 12/2012 Oglesby et al.
2012/0324737 A1 * 12/2012 Howell ............... B26B 21/4018 30/50
2018/0071929 A1 * 3/2018 Walker, Jr. .......... B26B 21/4075

(Continued)

FOREIGN PATENT DOCUMENTS

| | | |
|---|---|---|
| EP | 3292963 | 3/2018 |
| JP | 2014524790 | 9/2014 |
| KR | 1020130139508 | 12/2013 |

(Continued)

OTHER PUBLICATIONS

European Patent Office Application Serial No. 21192077.2, Search Report dated Jan. 26, 2022, 12 pages.

(Continued)

*Primary Examiner* — Evan H MacFarlane
*Assistant Examiner* — Liang Dong
(74) *Attorney, Agent, or Firm* — Knobbe, Martens, Olson, & Bear, LLP

(57) ABSTRACT

A razor cartridge is disclosed. The present disclosure in at least one embodiment provides a razor cartridge including a blade housing and a lubrication member providing unit, wherein the blade housing is configured to accommodate at least one first shaving blade having a cutting edge and at least one second shaving blade having a cutting edge to lie in a longitudinal direction, the lubrication member providing unit is configured to provide a lubrication member, and the lubrication member providing unit is coupled to the blade housing so that the lubrication member is positioned between the first shaving blade and the second shaving blade.

22 Claims, 5 Drawing Sheets

(56) References Cited

U.S. PATENT DOCUMENTS

2019/0224872 A1* 7/2019 Han ...................... B26B 21/521

FOREIGN PATENT DOCUMENTS

KR 101887038 8/2018
WO WO-2013187692 A1 * 12/2013 ......... B26B 21/4012

OTHER PUBLICATIONS

Korean Intellectual Property Office Application No. 10-2020-0108460, Office Action dated Oct. 6, 2022, 5 pages.
Office Action in corresponding Korean Application No. 10-2020-0108460 dated Apr. 13, 2023.

* cited by examiner (a)

(b)

RAZOR CARTRIDGE

CROSS-REFERENCE TO RELATED APPLICATIONS

Pursuant to 35 U.S.C. § 119(a), this application claims the benefit of earlier filing date and right of priority to Korean Patent Application Number 10-2020-0108460, filed on Aug. 27, 2020, the contents of which is hereby incorporated by reference herein in its entirety.

TECHNICAL FIELD

The present disclosure in some embodiments relates to a razor cartridge. More specifically, the present disclosure relates to a razor cartridge having a lubrication member.

BACKGROUND

The statements in this section merely provide background information related to the present disclosure and do not necessarily constitute prior art.

A conventional razor assembly, generally known as a wet razor, includes a razor handle and a razor cartridge which includes a blade housing for accommodating at least one shaving blade.

However, in the use of a wet razor, the friction force generated between the blade housing and the skin, the cutting force applied to the body hair to cut the same, the stimulation to a wounded skin area, etc. may cause inconvenience to the user.

To reduce such discomfort, conventionally used when shaving are shaving aids such as shaving foam, shaving gel, and shaving cream. A recent solution is a lubrication band containing a lubricating material that is fixedly formed on a razor cartridge to give a soft feeling when shaving. Such a lubricating band contains a lubricating material until it comes in contact with water which in turn melts out the lubricating material.

However, the conventional shaving aids demand their preparation stage to add to the production of razors, which is disadvantageous and more so when combined with an insufficient delivery of softness with the existing lubricating band alone. Additionally, the conventional razor having a flat, fixed shaving surface against body curves hinders the lubricating material from properly acting on the body surfaces, which is ineffective to offer softness during shaving.

On the other hand, a shaving session usually takes more than several trips of the razor cartridge, involving the user to clean the cartridge with flowing water before or after shaving. At this time, the narrow spacing between the shaving blades and the complicated cartridge structure have an adverse consequence of improper discharging of shaving residues present in the cartridge.

SUMMARY

According to at least one embodiment, the present disclosure provides a method including a razor cartridge including a blade housing and a lubrication member providing unit. The blade housing is configured to accommodate at least one first shaving blade having a cutting edge and at least one second shaving blade having a cutting edge to lie in a longitudinal direction. The lubrication member providing unit is configured to provide a lubrication member. The lubrication member providing unit is coupled to the blade housing so that the lubrication member is positioned between the first shaving blade and the second shaving blade.

REFERENCE NUMERALS

Figure 1:
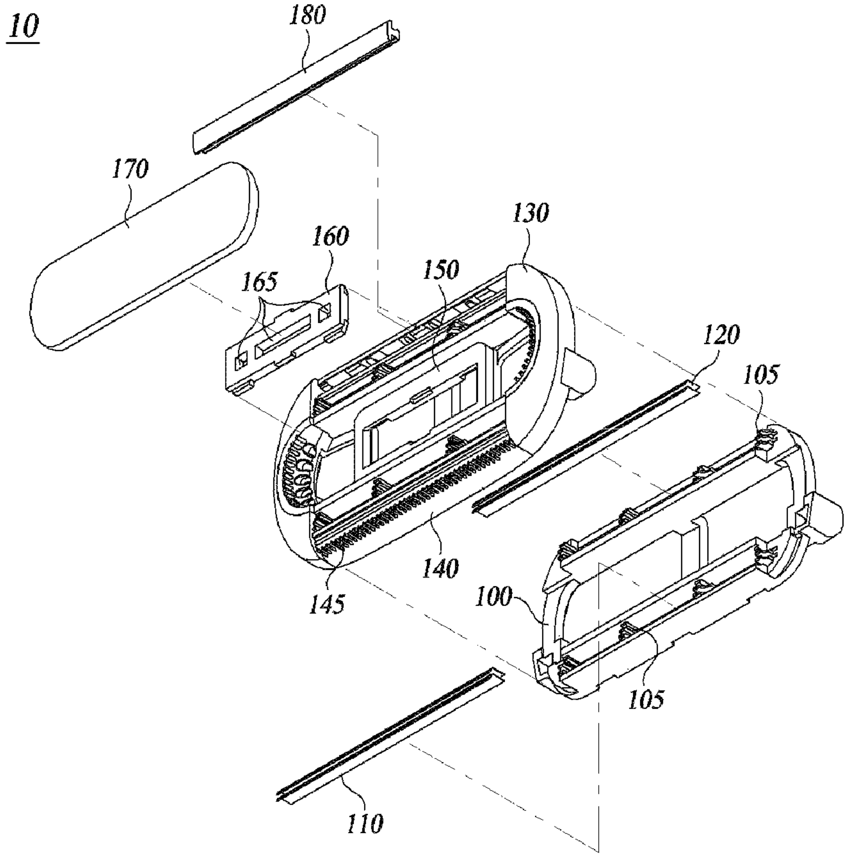
FIG. 1 is an exploded perspective view of a razor cartridge according to at least one embodiment of the present disclosure.

10: razor cartridge 100: blade housing
105: blade accommodating unit 110: first shaving blade
120: second shaving blade 130: lubrication member providing unit
135: elastic bridge 140: guard portion
145: guard protrusion 150: lubrication member accommodating unit
160: lubrication member holder 165: combining hole
170: lubrication member 180: cap portion
200: opening portion 220: elastic coating portion
400: structure 420: protrusion unit
440: recess 600: first shaving plane
620: second shaving plane

DETAILED DESCRIPTION

Accordingly, to solve the above-identified issues, the present disclosure seeks to provide a razor cartridge having excellent washability while providing a soft contact feeling and a cushiony feeling to the user's skin during shaving.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is an exploded perspective view of a razor cartridge 10 according to at least one embodiment of the present disclosure.

Figure 2:
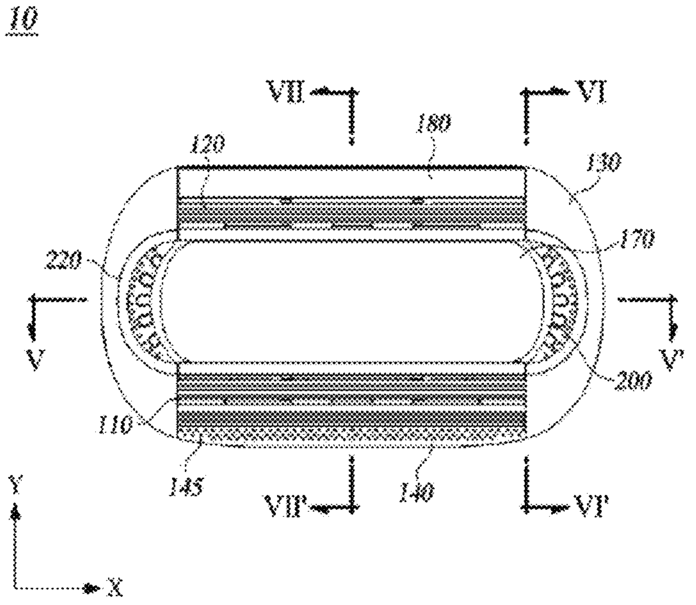
FIG. 2 is a front view of the razor cartridge according to at least one embodiment of the present disclosure.

FIG. 2 is a front view of the razor cartridge 10 according to at least one embodiment.

Figure 3:
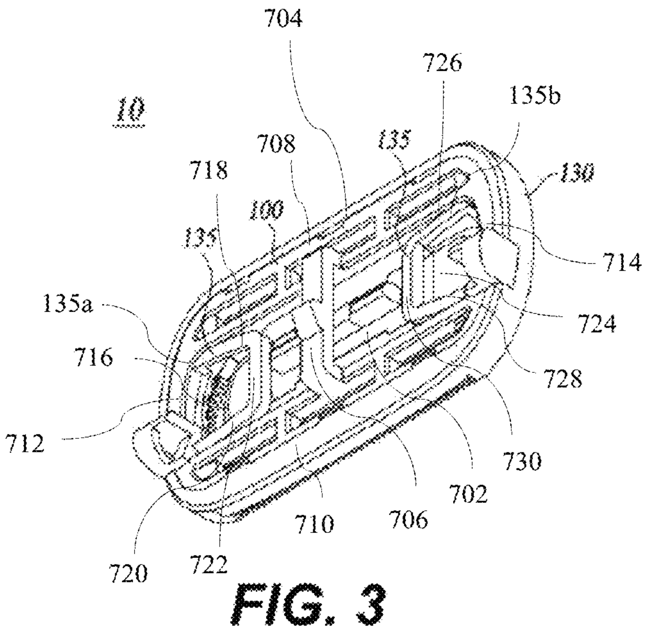
FIG. 3 is a rear perspective view of the razor cartridge according to at least one embodiment of the present disclosure.

FIG. 3 is a rear perspective view of the razor cartridge 10 according to at least one embodiment.

As shown in FIGS. 1 to 3, a razor cartridge 10 according to at least one embodiment of the present disclosure includes all or some of a first shaving blade 110, a second shaving blade 120, a blade housing 100, a lubrication member providing unit 130, a lubrication member accommodating unit 150, a lubrication member holder 160, a guard portion 140, a cap portion 180, and two opening portions 200.

The first shaving blade 110 has a cutting edge, and there may be at least one or more of the first shaving blade 110 depending on the configuration of the razor cartridge 10. The second shaving blade 120 also has a cutting edge, and there may be at least one or more of those.

The cutting edge is configured to cut the user's body hair when shaving. The cutting edge of the first shaving blade 110 and the cutting edge of the second shaving blade 120 may be formed to be in the same direction. However, the present disclosure is not so limited, and the first and second shaving blades 110 and 120 may be formed to face opposite directions to effect non-directional shaving regardless of laterality between right and left-hand grips or a shaving direction of the razor.

On the other hand, as shown in FIG. 1, the cutting edge may be formed into, but is not necessarily limited to, a bended blade, and it may be formed into a flat blade or a welded blade. This is also applicable to the illustrations in FIGS. 2 to 7 below.

On the other hand, when the razor cartridge 10 is configured to have multiples of the first shaving blade 110 and multiples of the second shaving blade 120, the spacing between the multiple first shaving blades 110 and the spacing between the multiple second shaving blades 120 may be set to be equal, although the present disclosure encompasses other different configurations.

The blade housing 100 accommodates the first shaving blade 110 and the second shaving blade 120 to lie in a longitudinal direction. Here, the longitudinal direction refers to the width direction of the blade housing 100, and a transverse direction refers to the height direction of the blade housing 100. For example, in FIG. 2, the vertical direction is in parallel to the X-axis, and the transverse direction is in parallel to the Y-axis.

The blade housing 100 may include a blade accommodating unit 105 for accommodating the first shaving blades 110 and the second shaving blades 120.

The lubrication member providing unit 130 provides a lubrication member 170 and is coupled to the blade housing 100 so that the lubrication member 170 is positioned between the first shaving blade 110 and the second shaving blade 120. In this case, the lubrication member 170 may be configured to be located centrally of the blade housing 100. However, the lubrication member 170 does not necessarily have to be located in the center of the blade housing 100, and it may be relocated depending on the number and/or arrangement of the first shaving blades 110 and the second shaving blades 120.

The lubrication member 170 is configured to apply a lubricating material to the user's skin to assist shaving while providing softness to the user. Accordingly, the lubrication member 170 may be in a solid form containing a lubricating material and may be formulated with a surfactant, such as soap.

The longitudinal length of the lubrication member 170 is preferably configured to be equal to or greater than the transverse length of the first shaving blade 110 and the second shaving blade 120 so that the transverse span of a body subject to haircutting performed by the shaving blades can be fully applied with the lubrication member 170. However, the present disclosure is not necessarily limited to this configuration.

The razor cartridge 10 according to at least one embodiment including the lubrication member 170 saves the need for a separate shaving aid, such as a shaving foam, shaving gel, shaving cream, or the like for providing softness when shaving.

On the other hand, in the razor cartridge 10 according to at least one embodiment, the lubrication member 170 is located between the first shaving blade 110 and the second shaving blade 120, the lubricating material can be continuously applied to the user's skin throughout the process of shaving, so the user can consistently get a soft feel when shaving. Additionally, with the lubrication member 170 relatively located centrally of the razor cartridge 10 according to at least one embodiment, the lubricating material can be easily applied even when shaving a boundary area including a curved body part, such as an armpit, a chin, and a neck.

Meanwhile, as shown in FIG. 1, the rear of the lubrication member providing unit 130 may be coupled to the front of the blade housing 100. Here, the front refers to a surface on the side where the razor cartridge 10 according to at least one embodiment comes in contact with the user's skin, and the rear refers to a surface formed on the opposite side to the front.

When the rear of the lubrication member providing unit 130 is coupled to the front of the blade housing 100, the first shaving blades 110 and the second shaving blades 120 may be fixed by the mating between the lubrication member providing unit 130 and the blade housing 100. In particular, the first shaving blades 110 and the second shaving blades 120, which are depressed at their front opposite ends by the lubrication member providing unit 130, can be more firmly fixed to the blade housing 100 without the need for a fixing clip (not shown).

However, it is not necessarily required that the rear of the lubrication member providing unit 130 is coupled to the front of the blade housing 100 and, instead, the front of the lubrication member providing unit 130 may be coupled to the rear of the blade housing 100. In this case, the first shaving blades 110 and the second shaving blades 120 may be accommodated in the blade housing 100 and then supported by a plurality of fixing clips.

The lubrication member providing unit (or a shaving aid housing) 130 may include two elastic bridges 135. The elastic bridges 135 support the lubrication member 170 for enabling the lubrication member 170 to move between an initial position and an end position with respect to the blade housing 100. As shown in FIG. 1, the elastic bridges 135 may be configured to be connected to regions adjacent to both lateral sides of the lubrication member providing unit 130 in the longitudinal direction to contact at least some of the rear surface of the lubrication member 170. Referring to FIG. 3, the shaving aid housing 130 may also include a shaving aid mount 702, and a frame 704. The elastic bridges 135 may include a first elastic bridge 135*a* and a second elastic bridge 135*b*. The frame 704 may include a center 706, a first portion 708, a second portion 710, a first lateral side portion 712, and a second lateral side portion 714. The first elastic bridge 135*a* may include a first opening 716, an upper portion 718, a lower portion 720, and a first lateral member 722. The first opening 716 may be defined by the upper portion 718, the first lateral member 722, and the lower portion 720. The first opening 716 may face the first lateral side portion 712. A width of the first opening 716 may become larger in a direction extending from the first lateral member 722 to the first lateral side portion 712. The second elastic bridge 135*b* may include a second opening 724, an upper portion 726, a lower portion 728, and a second lateral member 730. The second opening 724 may be separated from and unconnected to the first opening 716. The second opening 724 may be defined by the upper portion 726, the second lateral member 730, and the lower portion 728. The second opening 724 may face the second lateral side portion 714 and face away from the first opening 716. A width of the second opening 724 may become larger in a direction extending from the second lateral member 730 to the second lateral side portion 714.

For the movement of the lubrication member 170, the elastic bridges 135 may be formed of an elastic material, such as a rubber material, and the lubrication member 170 utilizes the elastic force of the elastic bridges 135 for moving between the initial position and the end position.

The lubrication member providing unit 130 may further include a lubrication member accommodating unit 150 for mounting the lubrication member 170 to the elastic bridges 135. The lubrication member accommodating unit 150 may be formed integrally with the elastic bridge 135 and configured to seat the lubrication member 170 on the front surface of the lubrication member accommodating unit 150, thereby preventing separation of the lubrication member 170 from the elastic bridges 135. However, the lubrication member accommodating unit 150 is not necessarily included in the lubrication member providing unit 130 or configured integrally with the elastic bridges 135. The lubrication member accommodating unit 150 may be configured as an independent element that is separate from the lubrication member providing unit 130 and has a coupling formation for mating with the elastic bridges 135.

The lubrication member holder 160 has one surface configured to be coupled to the lubrication member 170 and the other surface configured to be attached to and detachable from the lubrication member accommodating unit 150. In this configuration, the lubrication member 170 with as combined with the lubrication member holder 160 is attached to the lubrication member accommodating unit 150, which makes the manufacture of the razor cartridge 10 easier than a case where the lubrication member 170 is directly mounted on the lubrication member accommodating unit 150.

As shown in FIG. 1, at least some portion of the lubrication member holder 160 is formed with one or more combining holes 165 to embed corresponding portions of the lubrication member 170. In this case, the lubrication member 170 may be more firmly coupled to the lubrication member holder 160 by being embedded in the combining holes 165 thereof.

For the lubrication member holder 160 to be attached to the lubrication member accommodating unit 150, the rear surface of the lubrication member holder 160 and the front of the lubrication member accommodating unit 150 desirably conform to each other for their integration that is carried out. Additionally, the lubrication member holder 160 configured to be attached to and detachable from the lubrication member accommodating unit 150 facilitates a replacement of the lubrication member 170.

The razor cartridge 10 according to at least one embodiment of the present disclosure further includes a guard portion 140 disposed in front of the cutting edges of the first shaving blades 110. Here, the front and rear of the shaving blade are defined based on the shaving direction of the razor cartridge 10. Thus, with respect to the shaving blades in FIG. 2, the front of the shaving blades is in the negative Y-axis direction, and the rear of the shaving blades is in the positive Y-axis direction. The guard portion 140 may stretch the skin before the body hair is cut by the shaving blades in the process of shaving.

Accordingly, the user's body hair can be erected by the guard unit 140 in a direction perpendicular to the user's skin surface, facilitating the cutting of the body hair by the shaving blades. On the other hand, the guard portion 140 may be provided in the lubrication member providing unit 130, although it may be alternatively separated from the lubrication member providing unit 130 and placed in front of the cutting edge of the first shaving blades 110. Additionally, the guard portion 140 may be made of the same material as the elastic bridge 135 and formed integrally with the elastic bridge 135, although the present disclosure is not so limited.

The guard portion 140 may include a plurality of guard protrusions 145 formed on one surface of the guard portion 140. The plurality of guard protrusions 145 may protrude on one surface of the guard portion 140 in a direction perpendicular to the upper surface of the blade housing 100, although the present disclosure is not so limited.

The guard protrusions 145 may each have a shape of a cylinder or a polygonal column among other shapes. For example, the guard protrusions 145 may each have a shape elongated in the transverse or longitudinal direction. Additionally, some of the plurality of guard protrusions 145 may have a shape of a pillar, and other portions of them may have a shape extending elongated in the longitudinal or transverse direction.

The plurality of guard protrusions 145 may be made of an elastic material, thus providing a soft contact feeling and a tension feeling to the user's skin. However, the material of the plurality of guard protrusions 145 is not necessarily limited to an elastic material and may be made of a material other than an elastic material.

The razor cartridge 10 according to at least one embodiment further includes a cap portion 180 disposed behind the cutting edges of the second shaving blades 120. The cap portion 180 may be provided on the lubrication member providing unit 130, but it is not so limited and may be disposed behind the cutting edges of the second shaving blades 120 separately from the lubrication member providing unit 130.

The cap portion 180 may be topped with a lubricating band that contains a lubricating material, and thus it may serve to protect the user's skin when shaving. However, the lubricating band is not necessarily disposed on the cap portion 180, and it may be disposed adjacent to the cap portion 180.

On the other hand, the guard portion 140 and the cap portion 180 are not necessarily disposed only in front of the cutting edges of the first shaving blades 110 and behind the cutting edges of the second shaving blades 120, respectively. For example, the guard portion 140 may be disposed in front of the cutting edges of the first shaving blades 110 and behind the cutting edges of the second shaving blades 120. Likewise, the cap portion 180 may also be disposed behind the cutting edges of the second shaving blades 120 and in front of the cutting edges of the first shaving blades 110.

In front of the cutting edges of the first shaving blades 110 or the rear of the cutting edges of the second shaving blades 120, the guard portion 140 and the cap portion 180 may coexist with their order of arrangement being subject to change according to the purpose and use of the razor cartridge 10.

The opening portions 200 are formed on both longitudinal side areas of the lubrication member providing unit 130 to allow rinsing water to pass through the razor cartridge 10 according to at least one embodiment of the present disclosure in the areas adjacent to both longitudinal side surfaces of the lubrication member 170. Other than forming the opening portions 200 adjacent to both longitudinal side end parts of the lubrication member 170, the present disclosure may have the opening portions 200 formed in any other ways as long as they let the rinsing water run through the razor cartridge 10 according to at least one embodiment. For example, the opening portions 200 may be formed adjacent to both longitudinal side ends of the lubrication member providing unit 130. In other words, the opening portions 200 may be formed at positions shifted in the negative X-axis or the positive X-axis direction from those as illustrated in FIG. 2.

With the opening portions 200 provided in the razor cartridge 10 according to at least one embodiment, shaving residues present after shaving between the surface of the lubrication member 170 and the shaving blades can be discharged smoothly. In other words, when the front or rear of the cartridge 10 is brought to meet with running water for cleaning, the water naturally passes through the opening portions 200 while flowing between the surface of the lubrication member 170 and the shaving blades, discharging shaving residues and foreign matters smoothly.

The razor cartridge 10 according to at least one embodiment of the present disclosure may be mounted on a razor handle (not shown). The user may shave by holding the razor handle and contacting the razor cartridge 10 according to at least one embodiment to the skin. In this case, the razor cartridge 10 according to at least one embodiment is connected to be pivotable about the razor handle, although it may use other methods of coupling.

For example, the razor cartridge 10 according to at least one embodiment is mounted on a razor handle in a replaceable arrangement, and a fixed type connector or a rotary type connector may also be used to mount the razor cartridge 10 on the razor handle. Additionally, one side of the razor cartridge 10 according to at least one embodiment is directly mounted on one side of the razor handle.

Figure 4:
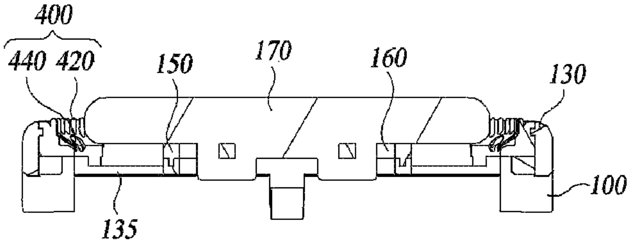
FIG. 4 is a cross-sectional view of the razor cartridge according to the embodiment taken in the direction V-V' of FIG. 2.

FIG. 4 is a cross-sectional view of the razor cartridge 10 according to at least one embodiment taken in the direction V-V' of FIG. 2.

Figure 5:
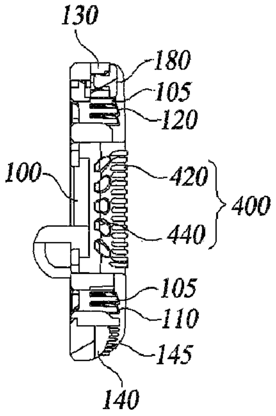
FIG. 5 is a cross-sectional view of the razor cartridge according to the embodiment taken in the direction VI-VI' of FIG. 2.

FIG. 5 is a cross-sectional view of the razor cartridge 10 according to at least one embodiment taken in the direction VI-VI' of FIG. 2.

As shown in FIGS. 2, 4, and 5, the opening portion 200 may be formed with a structure 400 in at least one of a periphery and an inner surface thereof. The structure 400 may be configured using a protrusion unit 420, a protuberance unit, a recess 440, a concave unit, or a combination of two or more of the same.

Meanwhile, the razor cartridge 10 may be formed with elastic coating portions 220 on at least a portion of one or more of peripheries and inner surfaces of the opening portion 200. The elastic coating portions 220 may be formed integrally with the elastic bridges 135, when they each have improved durability and do not require a separate assembly process between them. However, the elastic coating portions 220 do not necessarily have to be formed integrally with the elastic bridges 135.

The elastic coating portions 220 may be made of an elastic material, such as a rubber material, among other materials. The elastic coating portions 220 may stretch the surrounding skin where shaving is performed, especially before the body hair is cut by the second shaving blades 120. For example, the user may shave while drawing a curve rather than a straight line wherein the user's body hair may be erected by elastic coating portions 220 in a direction perpendicular to the skin surface, which facilitates cutting of the body hair by the second shaving blades 120.

When the razor cartridge 10 is formed with the elastic coating portions 220 on at least some of the peripheries, inner surfaces, or both of the opening portions 200, the structure 400 may be formed on the elastic coating portions 220. Likewise, the structure 400 and each of the elastic coating portions 220 may be formed by the protrusion unit 420, protuberance unit, recess 440, concave, or a combination of two or more of the same. The structure 400 may be made of the same material as the elastic coating portions 220, for example, a rubber material, so that the elastic coating portion 220 and the structure 400 when coming into contact with the skin during shaving still provide an adaptive adherence of the razor cartridge 10 and softness to the skin. Additionally, the structure 400 may be formed integrally or in any other ways with the elastic coating portions 220.

Since the recess 440 and the concave portion can hold bubbles generated by the lubricating material included in the lubrication member 170 during shaving, the opening portion 200 can keep the bubbles last longer once generated by the lubricating material.

The protrusion unit 420 and the protuberance unit serve to attract bubbles generated by the lubricating material toward the opening portion 200. The protrusion unit 420 and the protuberance unit prevent the bubbles generated by the lubricating material from leaving the razor cartridge 10, allowing the recess 440 and the concave portion to continuously hold the bubbles. Additionally, the protrusion units 420 and the protuberance units cause friction with the skin to generate so that more abundant bubbles by the shaving aid and the lubricating material. The protrusion unit 420 and protuberance unit may be formed at multiple locations, thereby holding the bubbles between the protrusion unit 420 and the protuberance unit at the relevant locations.

The razor cartridge 10 according to at least one embodiment of the present disclosure includes the structure 400 as described above to provide the user with softness that lasts longer for the shaving pleasure of the user.

The structure 400 may be formed in a single location or multiple locations, and it may be formed of an elastic material or other unlimited elastic or non-elastic materials. When a plurality of structures 400 is formed, they need not be made to have a uniform shape.

For example, the protrusion unit 420 and the protuberance unit may have a shape of a cylindrical or a polygonal column, and when the structure 400 is formed using a plurality of protrusion units 420, some of them may have a cylindrical shape and other portions may have a shape of a polygonal column. The cylindrical-column structures 400 may further have different sizes of cylindrical shape. The polygonal-column structures 400 may further have different sizes of a polygonal shape. The shapes of the protrusion unit 420 and the protuberance unit are not necessarily limited to have cylindrical or polygonal columns.

Likewise, the recess 440 and the concave portion may also have various shapes. The structure 400 may be formed using a plurality of recesses 440, wherein the recessed shape of the respective recesses 440 may be different and combined with variations of depth.

Figure 6:
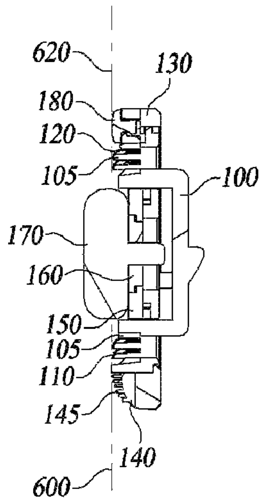
FIG. 6 is a cross-sectional view of the razor cartridge according to the embodiment taken in the direction VII-VII' of FIG. 2.

FIG. 6 is a cross-sectional view of the razor cartridge 10 according to at least one embodiment taken in the direction VII-VII' of FIG. 2.

As shown in FIG. 6, the razor cartridge 10 according to at least one embodiment of the present disclosure includes a first shaving plane 600 and a second shaving plane 620. Here, the first shaving plane 600 refers to a plane formed by the upper surface of the guard portion 140 and the cutting edges of the first shaving blades 110, and the second shaving plane 620 refers to a plane formed by the upper surface of the cap portion 180 and the cutting edges of the second shaving blades 120.

The first shaving plane 600 and the second shaving plane 620 may lie on the same plane, to which the disclosure is not limited, and they may lie on different planes. Additionally, the first shaving plane 600 and the second shaving plane 620 may lie parallel to each other, to which the disclosure is not limited, and they may be inclined to each other.

Figure 7:
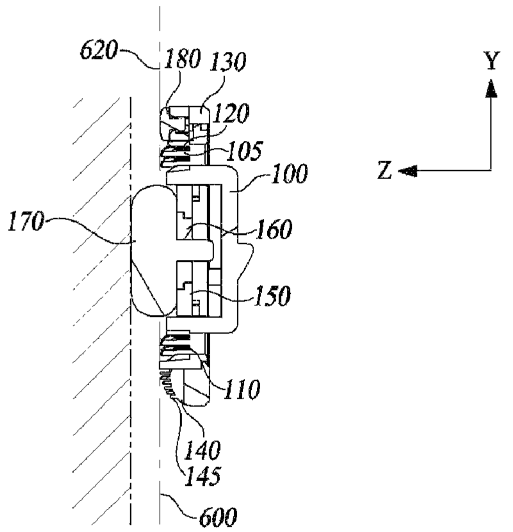
FIG. 7 is cross-sectional views illustrating an initial position and an end position of a lubrication member of the razor cartridge according to at least one embodiment of the present disclosure.
Figure 7:
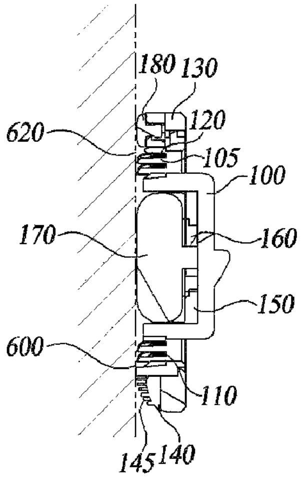

FIG. 7 is cross-sectional views illustrating an initial position and an end position of a lubrication member 170 of the razor cartridge 10 according to at least one embodiment of the present disclosure.

FIG. 7 illustrates at (a) the lubrication member 170 as residing in the initial position, FIG. 7 illustrates at (b) the lubrication member 170 as residing in the end position. Here, the initial position refers to a position occupied by the lubrication member 170 before the user starts shaving, and the end position refers to a position in which the lubrication member 170 is in while the user is shaving. However, the initial position and the end position are not always fixed at a certain position, and as the lubrication member 170 gets worn down by repeatedly using the razor cartridge 10 according to at least one embodiment, those positions may change depending on the degree of wear.

FIG. 7 illustrates a case where the lubrication member 170 moves in a direction perpendicular to the upper surface of the lubrication member 170, but the lubrication member 170 is not limited to move in the direction perpendicular to the upper surface. For example, the lubrication member 170 may be arranged to move in the longitudinal and transverse directions of the lubrication member 170. Therefore, even when shaving curved surfaces, the lubrication member 170 capable of moving along the user's body curvature helps to apply the lubricating material included in the lubrication member 170 evenly over the curved skin surfaces.

As shown in FIG. 7 at (a), in its initial position, the upper end of the lubrication member 170 may be placed in a position spaced apart from the first shaving plane 600 as well as the second shaving plane 620. For example, the user may contact the lubrication member 170 with the skin before starting shaving for allowing the lubricating material to be sufficiently applied to the skin with no body hair being cut. However, the position of the upper end of the lubrication member 170 is not necessarily limited to that as illustrated. For example, when the first shaving plane 600 and the second shaving plane 620 are on different planes, the upper end of the lubrication member 170 may be may be placed in a position spaced apart from either the first shaving plane 600 or the second shaving plane 620.

As shown in FIG. 7 at (b), in the end position, the upper end of the lubrication member 170 may lie flush with the first shaving plane 600 and the second shaving plane 620. However, in the end position at some body curves of the user, the upper end of the lubrication member 170 may not lie flush with the first shaving plane 600 and the second shaving plane 620. For example, over a concave body part, the upper end of the lubrication member 170 may be placed on a plane higher than the first shaving plane 600 and the second shaving plane 620. Over a convex body part, the lubrication member 170 may be placed on a plane lower than the first shaving plane 600 and the second shaving plane 620.

Additionally, in the end position, a portion of the lubrication member 170, for example, the upper end of the lubrication member 170 or the upper end at its side toward the negative Y-axis direction may lie flush with the first shaving plane 600. In this case, the razor cartridge 10 according to at least one embodiment has the lubrication member 170 serve as a cap obviating the need for a separate cap to be formed between the first shaving blade 110 and the lubrication member 170. This enables the first shaving blades 110 to proceed with the shaving smoothly while keeping them from cutting the skin.

Likewise, in the end position, a portion of the lubrication member 170, for example, the upper end of the lubrication member 170 or the upper end at its side toward the positive Y-axis direction may lie flush with the second shaving plane 620. In this case, the razor cartridge 10 renders the lubrication member 170 to serve as a guard obviating the need for a separate guard to be formed between the second shaving blade 120 and the lubrication member 170. This enables the second shaving blades 120 to proceed with the shaving smoothly while keeping them from cutting the skin.

Therefore, while the user is in the course of shaving, the upper end of the lubrication member 170 lies flush with or adjacent to the first shaving plane 600 and/or the second shaving plane 620, thereby allowing shaving to be smoothly performed by the first shaving blades 110 and the second shaving blades 120.

It is not necessarily required to perform shaving by the first shaving blades 110 and the second shaving blades 120 at the same time. For example, even with the first shaving plane 600 and the second shaving plane 620 lying on the same plane, the razor cartridge 10 when made to be rotatable about its razor handle can use either the first shaving blades 110 or the second shaving blades 120 alone to perform shaving.

Additionally, when the first shaving plane 600 and the second shaving plane 620 lie on different planes, for example, when the first shaving plane 600 and the second shaving plane 620 are inclined to each other, shaving may be performed just by the first shaving blades 110 or the second shaving blades 120. However, even when the first shaving plane 600 and the second shaving plane 620 are inclined to each other, shaving can be done by the first shaving blades 110 and the second shaving blades 120 at the same time.

Since the lubrication member 170 is supported by the elastic bridges 135 having an elastic force, the lubrication member 170 can move independently between the initial position and the end position with respect to the first shaving plane 600 and the second shaving plane 620. The razor cartridge 10 according to at least one embodiment of the present disclosure can provide a cushiony feeling and softness to the user when shaving, since the lubrication member 170 is movable as described above between the initial position and the end position.

As described above, the present disclosure in at least one embodiment can provide a razor cartridge 10 that has excellent detersiveness while providing a soft touch and cushiony feeling to the user's skin during shaving.

Although exemplary embodiments of the present disclosure have been described for illustrative purposes, those skilled in the art will appreciate that various modifications, additions, and substitutions are possible, without departing from the idea and scope of the claimed invention. Therefore exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A razor cartridge, comprising:

at least one first shaving blade;

at least one second shaving blade;

a blade housing configured to accommodate the at least one first shaving blade having a cutting edge and the at least one second shaving blade having a cutting edge to lie in a longitudinal direction;

a shaving aid; and a shaving aid housing configured to accommodate the shaving aid, wherein the shaving aid housing is coupled to the blade housing so that the shaving aid is positioned between the at least one first shaving blade and the at least one second shaving blade, wherein the cutting edge of the at least one second shaving blade and the cutting edge of the at least one first shaving blade extend codirectionally, wherein the at least one first shaving blade and the at least one second shaving blade are fixed between the shaving aid housing and the blade housing, wherein the at least one first shaving blade and the at least one second shaving blade are configured to be pressed by the shaving aid housing, wherein the shaving aid housing comprises:

a frame comprising a first portion, a second portion, a first lateral side portion, and a second lateral side portion, the first lateral side portion connected to the first portion and the second portion in a direction perpendicular to the longitudinal direction, the second lateral side portion connected to the first portion and the second portion in the direction perpendicular to the longitudinal direction, a shaving aid mount, a first elastic bridge and a second elastic bridges spaced apart from each other in the longitudinal direction, the first and second elastic bridges respectively connected to the first lateral side portion and the second lateral side portion, the first and second elastic bridges spaced apart and facing away from a center of the frame, the first and second elastic bridges each comprising an upper portion and a lower portion respectively extending from the first lateral side portion and the second lateral side portion toward the center of the frame, the first and second elastic bridges each comprising a lateral member connecting the upper portion and the lower portion in a direction crossing the longitudinal direction, the first elastic bridge comprising a first opening, the first opening defined by the upper portion of the first elastic bridge, the lateral member of the first elastic bridge, and the lower portion of the first elastic bridge, the first opening facing the first lateral side portion, the second elastic bridge comprising a second opening separated from and unconnected to the first opening, the second opening defined by the upper portion of the second elastic bridge, the lateral member of the second elastic bridge, and the lower portion of the second elastic bridge, the second opening facing the second lateral side portion and facing away from the first opening, the first and second elastic bridges configured to elastically support different portions of the shaving aid such that the shaving aid is movable between an initial position and an end position with respect to the blade housing, the shaving aid mount configured to connect the lateral members of the first and second elastic bridges and configured to mount the shaving aid over the first and second elastic bridges, and wherein the upper portion, the lateral member, and the lower portion of the first bridge together create a first free end, and wherein the upper portion, the lateral member, and the lower portion of the second bridge together create a second free end facing the first free end.

2. The razor cartridge of claim 1, wherein the shaving aid is configured to be located centrally in the blade housing.

3. The razor cartridge of claim 1, further comprising:

a shaving aid holder having one surface configured to be coupled with the shaving aid and an opposite surface configured to be detachably attached to the shaving aid mount, the shaving aid holder at least partially accommodated in a central opening of the shaving aid mount that overlaps the shaving aid in a direction perpendicular to the longitudinal direction.

4. The razor cartridge of claim 3, wherein the shaving aid holder is configured to be detachably attached to the shaving aid mount.

5. The razor cartridge of claim 3, wherein the shaving aid holder is configured to be attached to the shaving aid mount such that the shaving aid mount surrounds the shaving aid holder.

6. The razor cartridge of claim 1, further comprising:

a guard portion disposed in front of the cutting edge of the at least one first shaving blade; and a cap portion disposed behind the cutting edge of the at least one second shaving blade, wherein the guard portion has an upper surface that is combined with the cutting edge of the at least one first shaving blade to form a first shaving plane, and the cap portion has an upper surface that is combined with the cutting edge of the at least one second shaving blade to form a second shaving plane.

7. The razor cartridge of claim 6, wherein at least one of the guard portion or the cap portion is provided in the shaving aid housing.

8. The razor cartridge of claim 6, wherein the first shaving plane and the second shaving plane are coplanar.

9. The razor cartridge of claim 6, wherein the shaving aid in an initial position has an upper end that is placed at a position spaced apart from the first shaving plane and the second shaving plane.

10. The razor cartridge of claim 1, wherein the shaving aid housing comprises opening portions respectively formed between one of the first and second lateral side portions and the shaving aid mount to allow rinsing water to pass through the razor cartridge in regions adjacent to both longitudinal side surfaces of the shaving aid.

11. The razor cartridge of claim 10, further comprising:

structures each formed on one or more of peripheries or inner surfaces of the opening portions, each structure including at least one of a protrusion unit, a protuberance unit, a recess, or a concave unit.

12. The razor cartridge of claim 10, further comprising:

elastic coating portions each formed on at least a portion of one or more of peripheries or inner surfaces of the opening portions.

13. The razor cartridge of claim 12, wherein the elastic coating portions are integrally formed with the first and second elastic bridges.

14. The razor cartridge of claim 12, wherein each of the elastic coating portions includes at least one of a protrusion unit, a protuberance unit, a recess, or a concave unit.

15. The razor cartridge of claim 1, wherein the cutting edge of the at least one first shaving blade is configured to form a first shaving plane, and the cutting edge of the at least one second shaving blade is configured to form a second shaving plane, and wherein the shaving aid comprises an upper surface, the upper surface being located to be higher than the first shaving plane and the second shaving plane at the initial position, and the upper surface being located to be flush with or lower than the first shaving plane and the second shaving plane at the end position.

16. The razor cartridge of claim 1, wherein the upper portion and the lower portion extend respectively from the first and second lateral side portions at an angle less than 90 degrees relative to the respective first and second lateral side portions.

17. The razor cartridge of claim 1, wherein an opening is formed opposite to the lateral member of each of the first elastic bridge and the second elastic bridge, the opening facing each of the first and second lateral side portions of the frame.

18. The razor cartridge of claim 1, wherein the first elastic bridge is removably coupled to the frame.

19. The razor cartridge of claim 1, wherein the first and second elastic bridges are cantilevered from the first and second lateral side portions of the frame.

20. The razor cartridge of claim 1, wherein the first free end and the second free end do not contact each other.

21. The razor cartridge of claim 1, wherein the shaving aid overlaps the lateral member of the first elastic bridge and the lateral member of the second elastic bridge when viewed from a top of the shaving aid.

22. The razor cartridge of claim 1, wherein a length of the shaving aid measured in the longitudinal direction is greater than a length in the longitudinal direction measured between the lateral member of the first elastic bridge and the lateral member of the second elastic bridge.

* * * * *